US012184993B2

(12) United States Patent
Sato et al.

(10) Patent No.: US 12,184,993 B2
(45) Date of Patent: Dec. 31, 2024

(54) MULTI-PINHOLE CAMERA AND IMAGE IDENTIFICATION SYSTEM

(71) Applicant: Panasonic Intellectual Property Corporation of America, Torrance, CA (US)

(72) Inventors: Satoshi Sato, Kyoto (JP); Yasunori Ishii, Osaka (JP); Ryota Fujimura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 141 days.

(21) Appl. No.: 18/089,055

(22) Filed: Dec. 27, 2022

(65) Prior Publication Data

US 2023/0138710 A1 May 4, 2023

Related U.S. Application Data

(63) Continuation of application No. PCT/JP2021/024214, filed on Jun. 25, 2021.

(30) Foreign Application Priority Data

Jul. 16, 2020 (JP) .................................. 2020-122188

(51) Int. Cl.
*H04N 23/955* (2023.01)
*G06V 10/147* (2022.01)
*G06V 10/70* (2022.01)

(52) U.S. Cl.
CPC ......... *H04N 23/955* (2023.01); *G06V 10/147* (2022.01); *G06V 10/70* (2022.01)

(58) Field of Classification Search
CPC .... H04N 23/955; H04N 23/50; G06V 10/147; G06V 10/70; G06V 40/20; G03B 19/16; G06T 7/00
See application file for complete search history.

(56) References Cited

U.S. PATENT DOCUMENTS

2006/0038909 A1\* 2/2006 Narabu .................. H04N 23/81
348/340
2018/0341858 A1\* 11/2018 Otterstedt ................. G02F 1/21
(Continued)

FOREIGN PATENT DOCUMENTS

KR 2013129645 A \* 11/2013
KR 2015110444 A \* 10/2015
(Continued)

OTHER PUBLICATIONS

International Search Report (English Language Translation), mailed Sep. 14, 2021, by the Japan Patent Office (JPO), issued in International Application No. PCT/JP2021/024214.

*Primary Examiner* — Timothy J Henn
(74) *Attorney, Agent, or Firm* — Greenblum and Bernstein, P.L.C.

(57) ABSTRACT

An interval between a pinhole and a pinhole is set to a first interval at which a degree of superimposition of subject images captured through the corresponding pinholes falls within a predetermined range when an image of a subject located at a distance less than a predetermined distance from the multi-pinhole camera is captured. An interval between the pinhole and a pinhole is set to a second interval narrower than the first interval at which a degree of superimposition of subject images captured through the corresponding pinholes falls within a predetermined range when an image of the subject located at a distance equal to or more than the predetermined distance from the multi-pinhole camera is captured.

7 Claims, 21 Drawing Sheets

(56) References Cited

U.S. PATENT DOCUMENTS

2019/0260963 A1\* 8/2019 Guo .......................... G09F 9/30
2019/0279026 A1\* 9/2019 Sato ....................... G06V 10/96

FOREIGN PATENT DOCUMENTS

WO     WO-2009090217 A1 \*   7/2009  ............. G02B 27/46
WO        2019/054092 A1     3/2019

\* cited by examiner

MULTI-PINHOLE CAMERA AND IMAGE IDENTIFICATION SYSTEM

TECHNICAL FIELD

The present disclosure relates to an image identification system in an environment requiring privacy protection, particularly in a home or indoor environment, and a multi-pinhole camera used for the image identification system.

BACKGROUND ART

Patent Literature 1 below discloses an image identification system in which a computational image is input to an identifier, and the identifier identifies an object included in the computational image using a learned identification model. Patent Literature 1 below also discloses a light-field camera using a multi-pinhole mask provided with multiple pinholes as an example of a camera for capturing a computational image.

The computational image is difficult to be visually recognized by a person due to blurring that is intentionally created due to an influence such as superimposition of multiple images each having a different viewpoint, or a subject image that is less likely to be focused due to non-use of a lens. Thus, the computational image is preferably used to construct an image identification system in an environment requiring privacy protection, such as home or indoor.

Unfortunately, Patent Literature 1 above discloses the multi-pinhole mask in which a method for setting an interval between the corresponding multiple pinholes is not studied in detail. Thus, privacy of a subject may not be protected depending on a distance between the camera and the subject because a desired blur cannot be obtained.

CITATION LIST

Patent Literature

Patent Literature 1: WO 2019/054092 A

SUMMARY OF INVENTION

It is an object of the present disclosure to provide a technique capable of protecting privacy of a subject regardless of a distance between a camera and the subject in an image identification system.

A multi-pinhole camera according to an aspect of the present disclosure includes: an image sensor; and a mask disposed between a light receiving surface of the image sensor and a subject and having a mask pattern provided with multiple pinholes including a first pinhole, a second pinhole adjacent to the first pinhole, and a third pinhole adjacent to the second pinhole, wherein an interval between the first pinhole and the second pinhole is set to a first interval, the first interval allowing a degree of superimposition of two subject images captured through the first pinhole and the second pinhole to be within a predetermined range when the subject located at a distance less than a predetermined distance from the multi-pinhole camera is captured by the multi-pinhole camera, and an interval between the second pinhole and the third pinhole is set to a second interval narrower than the first interval, the second interval allowing a degree of superimposition of two subject images captured through the second pinhole and the third pinhole to be within the predetermined range when the subject located at a distance equal to or more than the predetermined distance from the multi-pinhole camera is captured by the multi-pinhole camera.

Figure 1:
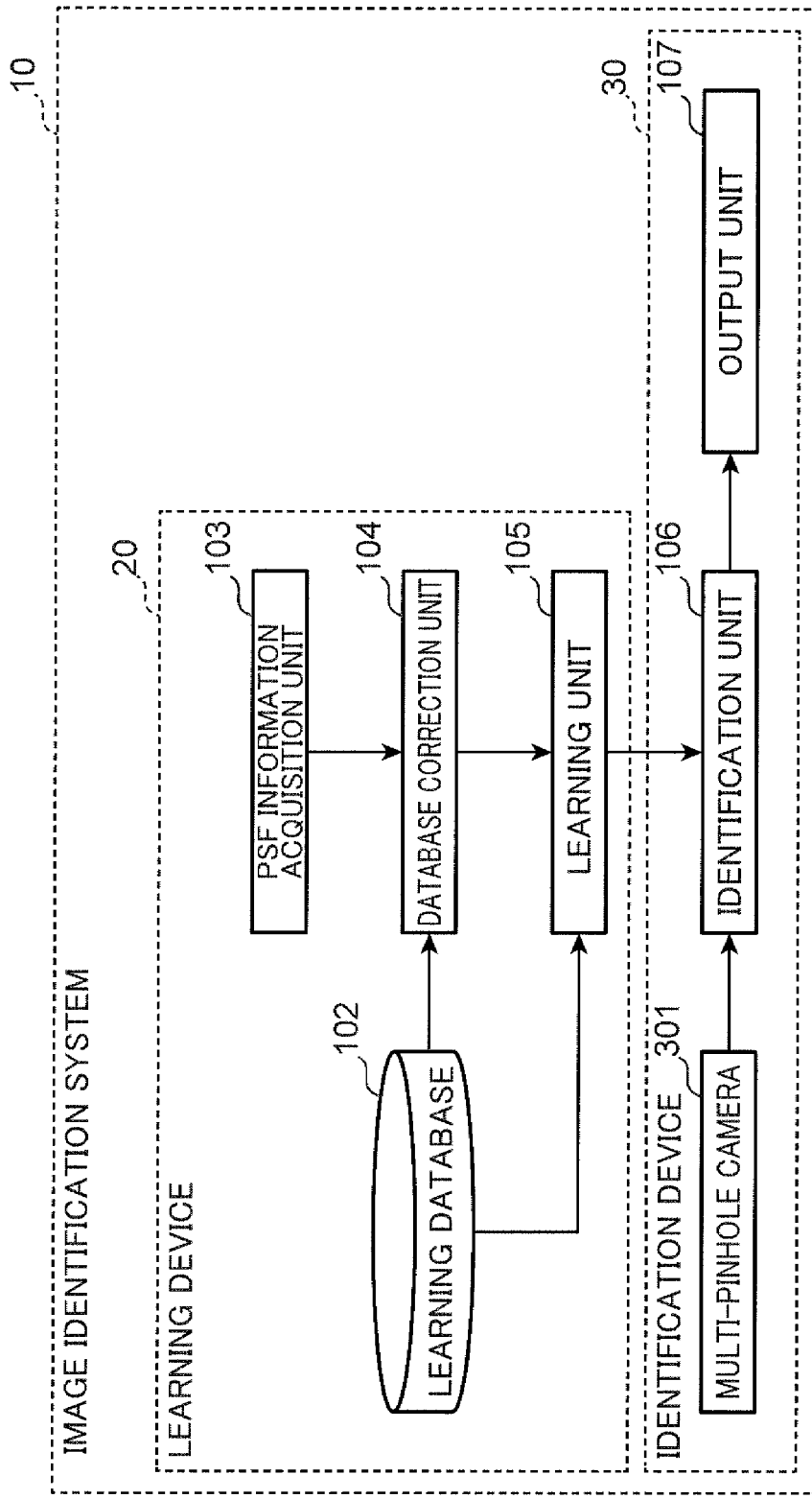
FIG. 1 is a schematic diagram illustrating a configuration of an image identification system according to an embodiment.

DESCRIPTION OF EMBODIMENTS (Underlying Knowledge of Present Disclosure)

Various recognition techniques in home, indoor, or the like, such as behavior recognition of a person in environment and person recognition of a device operator, are important. In recent years, a technique called deep learning has attracted attention for object identification. The deep learning is machine learning using a neural network having a multilayer structure, and enables achieving more accurate identification performance as compared with a conventional method by using a large amount of learning data. In such object identification, image information is particularly effective. Various methods have been proposed for greatly improving conventional object identification capability by using a camera as an input device and performing deep learning using image information as an input.

Unfortunately, disposing a camera in home or the like causes a problem in that privacy is violated when a captured image leaks to the outside due to hacking or the like. Thus, a measure is required to protect privacy of a subject even when a captured image leaks to the outside.

Computational images captured by a multi-pinhole camera or the like are difficult to be visually recognized by a person due to blurring that is intentionally created due to an influence such as superimposition of multiple images each having a different viewpoint, or a subject image that is less likely to be focused due to non-use of a lens. Thus, the computational image is preferably used to construct an image identification system in an environment requiring privacy protection, such as home or indoor.

The image identification system disclosed in Patent Literature 1 is configured such that a target area is photographed by a light-field camera including a multi-pinhole mask, or the like, and a computational image acquired by the photographing is input to an identifier. This configuration allows the identifier to identify an object included in the computational image using a learned identification model. When the target area is photographed by a light-field camera or the like that captures a computational image as described above, privacy of a subject can be protected even when the photographed image leaks to the outside due to the computational image that is difficult to be visually recognized by a person.

Unfortunately, Patent Literature 1 above discloses the multi-pinhole mask in which a method for setting an interval between the corresponding multiple pinholes is not studied in detail. Thus, privacy of a subject may not be protected depending on a distance between the camera and the subject because a desired difficulty of visual recognition cannot be obtained. For example, a too wide interval between the pinholes may cause a too large amount of disparity for a small subject image when a distance between the camera and the subject is relatively long, and thus resulting in that the face of the subject is recognized because multiple subject images are not superimposed. In contrast, a too narrow interval between the pinholes may cause a too small amount of disparity for a large subject image when a distance between the camera and the subject is relatively short, and thus resulting in that the face of the subject is recognized.

To solve such a problem, the present inventors have found that privacy of a subject can be protected regardless of a distance between a camera and the subject by using a mask pattern including at least three pinholes formed at different intervals and setting each of the intervals to allow a degree of superimposition of subject images to be within a predetermined range, and have conceived the present disclosure.

Next, each aspect of the present disclosure will be described.

A multi-pinhole camera according to an aspect of the present disclosure includes: an image sensor; and a mask disposed between a light receiving surface of the image sensor and a subject and having a mask pattern provided with multiple pinholes including a first pinhole, a second pinhole adjacent to the first pinhole, and a third pinhole adjacent to the second pinhole, wherein an interval between the first pinhole and the second pinhole is set to a first interval, the first interval allowing a degree of superimposition of two subject images captured through the first pinhole and the second pinhole to be within a predetermined range when the subject located at a distance less than a predetermined distance from the multi-pinhole camera is captured by the multi-pinhole camera, and an interval between the second pinhole and the third pinhole is set to a second interval narrower than the first interval, the second interval allowing a degree of superimposition of two subject images captured through the second pinhole and the third pinhole to be within the predetermined range when the subject located at a distance equal to or more than the predetermined distance from the multi-pinhole camera is captured by the multi-pinhole camera.

When the subject is located at a distance less than the predetermined distance from the multi-pinhole camera, this configuration allows the degree of superimposition of the two subject images captured through the first pinhole and the second pinhole to be within the predetermined range, and thus causing the multiple subject images to be visually unrecognizable by a human due to a multiple image, thereby protecting privacy of the subject. In contrast, when the subject is located at a distance equal to or more than the predetermined distance from the multi-pinhole camera, this configuration allows the degree of superimposition of the two subject images captured through the second pinhole and the third pinhole to be within the predetermined range, and thus causing the multiple subject images to be visually unrecognizable by a human due to a multiple image, thereby protecting privacy of the subject. As a result, the privacy of the subject can be protected regardless of the distance between the multi-pinhole camera and the subject.

The above aspect is configured such that when the multi-pinhole camera captures an image of the subject located at a distance equal to or more than the predetermined distance from the multi-pinhole camera, a degree of superimposition of two subject images captured through the first pinhole and the second pinhole is outside the predetermined range, and when the multi-pinhole camera captures an image of the subject located at a distance less than the predetermined distance from the multi-pinhole camera, a degree of superimposition of two subject images captured through the second pinhole and the third pinhole is outside the predetermined range.

This configuration enables protecting the privacy of the subject regardless of the distance between the multi-pinhole camera and the subject by setting the first interval and the second interval in a mixed manner in the same mask, even when the privacy of the subject cannot be completely protected by setting only one of the first interval and the second interval.

The above aspect may be configured such that the multi-pinhole camera includes no optical system that forms an image of light from a subject on the image sensor.

This configuration enables blurring to be intentionally created in an image captured by the multi-pinhole camera because the multi-pinhole camera includes no optical system that forms an image of light from a subject on the image sensor. As a result, the subject included in the captured image is further difficult to be visually identified by a human, so that an effect of protecting the privacy of the subject can be further enhanced.

The above aspect may be configured such that opening areas of the first pinhole, the second pinhole, and the third pinhole are different from each other.

This configuration causes a different degree of blurring of each subject image due to the difference in opening area of each pinhole. Mixture of multiple subject images different in a degree of blurring causes a captured image to be more complicated. As a result, the subject included in the captured image is further difficult to be visually identified by a human, so that an effect of protecting the privacy of the subject can be further enhanced.

The above aspect may be configured such that when the mask is divided into multiple regions in the mask pattern, each of the multiple regions includes a pinhole set of the first pinhole and the second pinhole, and a pinhole set of the third pinhole and the second pinhole.

This configuration enables light from the subject to reach the image sensor through the pinhole set on a side close to the subject even at a large angle formed by a front direction of the multi-pinhole camera and a position of the subject. As a result, a field of view at which a multiple image is feasible can be expanded.

The above aspect may be configured such that, in the mask pattern, a number of pinhole sets including the first pinhole and the second pinhole is larger than a number of pinhole sets including the third pinhole and the second pinhole.

This configuration enables increasing the number of valid superimposition of a multiple image when the subject is located at a distance less than a predetermined distance from the multi-pinhole camera. As a result, the subject included in a captured image is further difficult to be visually identified by a human, so that an effect of protecting the privacy of the subject can be further enhanced. This configuration is particularly effective for operation in a room where a distance between the multi-pinhole camera and the subject tends to be short.

The above aspect may be configured such that, in the mask pattern, a number of pinhole sets including the third pinhole and the second pinhole is larger than a number of pinhole sets including the first pinhole and the second pinhole.

This configuration enables increasing the number of valid superimposition of a multiple image when the subject is located at a distance equal to or more than the predetermined distance from the multi-pinhole camera. As a result, the subject included in a captured image is further difficult to be visually identified by a human, so that an effect of protecting the privacy of the subject can be further enhanced. This configuration is particularly effective for outdoor operation in which a distance between the multi-pinhole camera and the subject tends to be long.

An image identification system according to another aspect of the present disclosure includes: the multi-pinhole camera according to the above aspect; an identification unit that identifies an image captured by the multi-pinhole camera based on an image identification model; and an output unit that outputs an identification result acquired by the identification unit.

When the subject is located at a distance less than the predetermined distance from the multi-pinhole camera, this configuration allows the degree of superimposition of the two subject images captured through the first pinhole and the second pinhole to be within the predetermined range, and thus causing the multiple subject images to be visually unrecognizable by a human due to a multiple image, thereby protecting privacy of the subject. In contrast, when the subject is located at a distance equal to or more than the predetermined distance from the multi-pinhole camera, this configuration allows the degree of superimposition of the two subject images captured through the second pinhole and the third pinhole to be within the predetermined range, and thus causing the multiple subject images to be visually unrecognizable by a human due to a multiple image, thereby protecting privacy of the subject. As a result, the privacy of the subject can be protected regardless of the distance between the multi-pinhole camera and the subject.

The present disclosure can also be implemented as a computer program for causing a computer to execute each characteristic configuration included in a method as described above, or can also be implemented as a device or a system that operates based on the computer program. It is needless to say that such a computer program can be distributed as a computer-readable non-volatile recording medium such as a CD-ROM, or can be distributed via a communication network such as the Internet.

Each of the embodiments described below illustrates a specific example of the present disclosure. Numerical values, shapes, components, steps, order of steps, and the like shown in the following embodiments are merely examples, and are not intended to limit the present disclosure. The components in the embodiments below include a component that is not described in an independent claim representing the highest concept and that is described as an arbitrary component. All the embodiments have respective contents that can be combined.

Hereinafter, the embodiments of the present disclosure will be described in detail with reference to the drawings. Elements denoted by the same corresponding reference numerals in different drawings represent the same or corresponding elements.

EMBODIMENTS OF PRESENT DISCLOSURE

FIG. 1 is a schematic diagram illustrating a configuration of an image identification system 10 according to an embodiment of the present disclosure. The image identification system 10 includes a learning device 20 and an identification device 30. The identification device 30 includes a multi-pinhole camera 301, an identification unit 106, and an output unit 107. The identification unit 106 includes a processor such as a CPU, and a memory such as a semiconductor memory. The output unit 107 includes a display device, a speaker, or the like. The learning device 20 includes a learning database 102, a PSF information acquisition unit 103, a database correction unit 104, and a learning unit 105. The learning database 102 includes a storage unit such as an HDD, an SSD, or a semiconductor memory. The PSF information acquisition unit 103, the database correction unit 104, and the learning unit 105 each include a processor such as a CPU.

Figure 2:
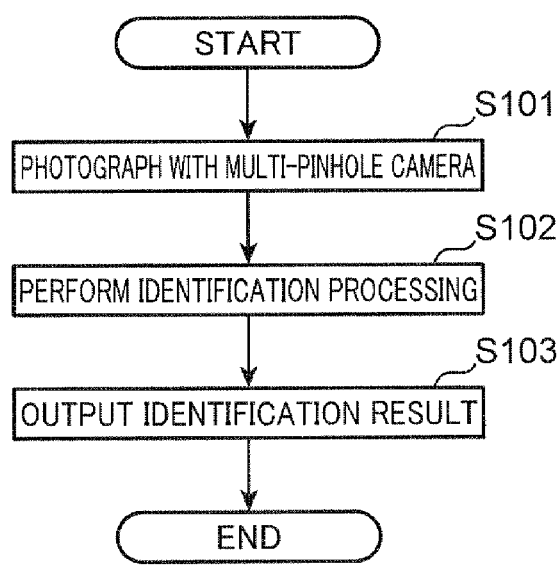
FIG. 2 is a flowchart illustrating a procedure of main processing of an image identification system.

FIG. 2 is a flowchart illustrating a procedure of main processing of the image identification system 10. The flowchart illustrates a flow of image identification processing of the identification device 30. The multi-pinhole camera 301 first photographs a target area where a subject as an image identification target is present, and inputs a computational image obtained by the photographing to the identification unit 106 (step S101). The identification unit 106 subsequently identifies the computational image using the learned image identification model (step S102). This image identification model is the image identification model created by learning of the learning device 20. Next, the output unit 107 outputs a result of identification of the identification unit 106. Details of the processing in each step will be described later.

Unlike a normal camera that captures a normal image that is easily visually recognized by a human, the multi-pinhole camera 301 captures a computational image formed of a multiple image that is difficult to be visually recognized by a human. Although a subject in the computational image cannot be recognized by a person who views the computational image itself, an image can be generated from the computational image by performing image processing on the captured computational image, the image being able to be recognized by the person or identified by the identification unit 106.

Figure 3:
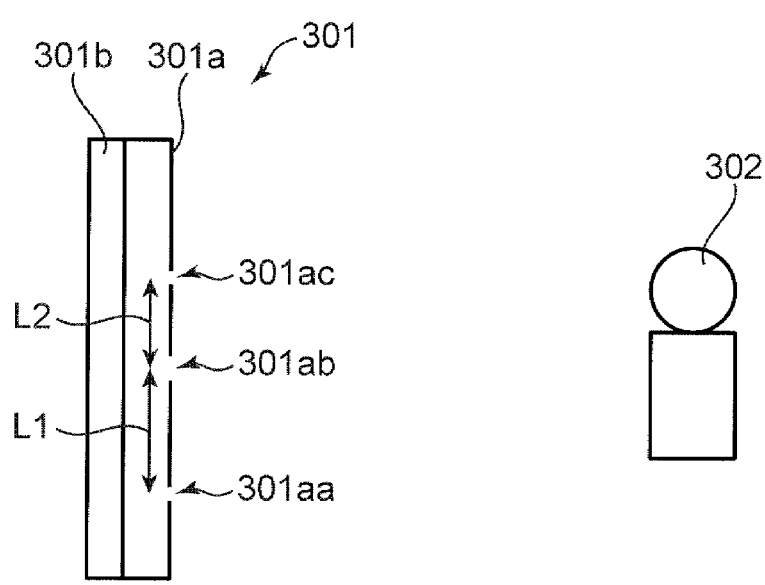
FIG. 3 is a diagram schematically illustrating structure of a multi-pinhole camera with no lens.

FIG. 3 is a diagram schematically illustrating structure of the multi-pinhole camera 301 with no lens. The multi-pinhole camera 301 illustrated in FIG. 3 includes a multi-pinhole mask 301a, and an image sensor 301b such as a CMOS. The multi-pinhole mask 301a is disposed at a predetermined interval from a light receiving surface of the image sensor 301b, between the image sensor 301b and the subject 302. Between the multi-pinhole mask 301a and the image sensor 301b, a cover glass for cutting IR and preventing reflection may be disposed. The cover glass and the image sensor 301b may be separated from or in contact with each other. The cover glass and the multi-pinhole mask 301a may be separated from or in contact with each other. The image sensor 301b, the cover glass, and the multi-pinhole mask 301a are supported by a housing in which a holder or a pillar for holding them is formed.

The multi-pinhole mask 301a has multiple pinholes 301aa to 301ac linearly disposed in this order. The pinhole 301aa and the pinhole 301ab are disposed at an interval L1, and the pinhole 301ab and the pinhole 301ac are disposed at an interval L2 (<L1). The present embodiment shows an example in which the pinholes 301aa to 301ac are equal in shape and opening area to each other. The multiple pinholes 301aa to 301ac are also referred to as multi-pinholes. The image sensor 301b acquires an image of a subject 302 through each of the pinholes 301aa to 301ac. The image acquired through a pinhole is referred to as a pinhole image. The multiple pinholes 301aa to 301ac do not necessarily need to be linearly disposed, and the pinholes 301aa to 301ac may be arranged at corresponding vertexes of a scalene triangle, for example.

The pinhole image of the subject 302 differs depending on a position and a size of each of the pinholes 301aa to 301ac, so that the image sensor 301b acquires a superimposed image (i.e., a multiple image) in a state in which multiple pinhole images are superimposed while being slightly shifted. The multiple pinholes 301aa to 301ac have a positional relationship that affects a positional relationship among the multiple pinhole images projected on image sensor 301b (i.e., a degree of superimposition of multiple images), and a size of each of the pinholes 301aa to 301ac affects a degree of blurring of a pinhole image.

Using the multi-pinhole mask 301a enables acquiring multiple pinhole images each having a different position and a different degree of blurring while superimposing the images. That is, a computational image can be acquired which is difficult to be visually recognized by a human due to an influence such as superimposition of multiple images each having a different viewpoint, or a subject image that is less likely to be focused due to non-use of a lens. Thus, a photographed image is a multiple image and a blurred image, and an image in which privacy of the subject 302 is protected due to influences of the multiple image and the blurred image can be acquired. When the pinholes are changed in number, position, and size, images different in degree of superimposition of multiple images and in degree of blur can be acquired. That is, the multi-pinhole mask 301a may be configured to be able to be easily attached and detached by a user, and multiple types of multi-pinhole mask 301a, each having a different mask pattern, may be prepared in advance to allow the user to freely replace the multi-pinhole mask 301a to be used.

Changing a mask as described above can be implemented by various methods in addition to the replacement of the mask, such as:
  a user arbitrarily rotating the mask rotatably attached in front of an image sensor;
  the user making a hole in an arbitrary place of the plate attached in front of the image sensor;
  using a liquid crystal mask or the like using a spatial light modulator or the like to arbitrarily set transmittance at each position in the mask; and
  molding a mask using a stretchable material such as rubber to change a position and a size of a hole by physically deforming the mask by application of an external force. Hereinafter, these modifications will be described in order.

<Modification in Which User Arbitrarily Rotates Mask>

Figure 13A:
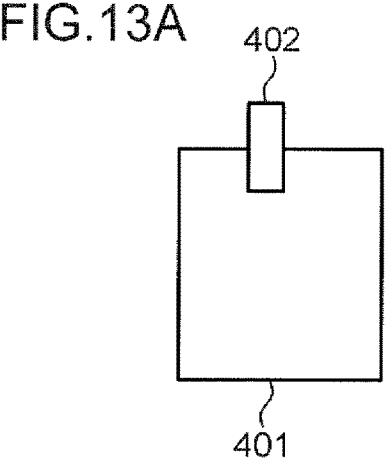
FIG. 13A is a schematic diagram illustrating a configuration of a multi-pinhole camera according to a modification.
Figure 13B:
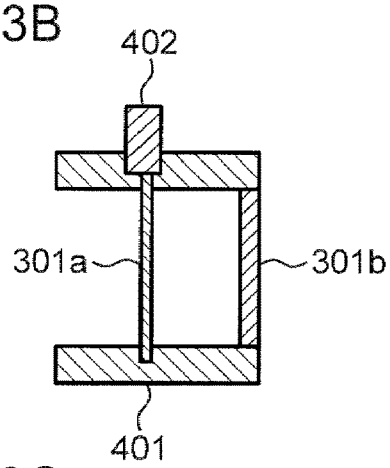
FIG. 13B is a schematic diagram illustrating a configuration of a multi-pinhole camera according to a modification.
Figure 13C:
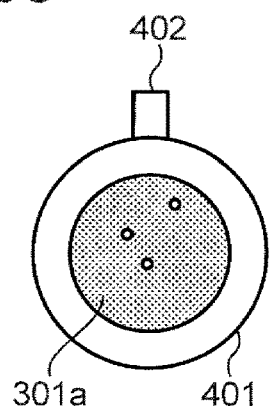
FIG. 13C is a schematic diagram illustrating a configuration of a multi-pinhole camera according to a modification.
Figure 13D:
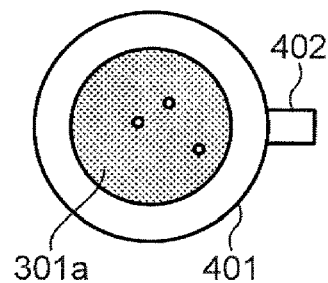
FIG. 13D is a schematic diagram illustrating a configuration of a multi-pinhole camera according to a modification.

FIGS. 13A to 13D are each a schematic diagram illustrating a configuration of the multi-pinhole camera 301 in which a user can arbitrarily rotate a mask. FIG. 13A illustrates an overview of the multi-pinhole camera 301 in which a user can arbitrarily rotate a mask, and FIG. 13B is a schematic diagram illustrating a section of the multi-pinhole camera 301. The multi-pinhole camera 301 includes the multi-pinhole mask 301a rotatable with respect to a housing 401, and a gripper 402 connected to the multi-pinhole mask 301a. The user can fix or rotate the multi-pinhole mask 301a with respect to the housing 401 by gripping and operating the gripper 402. This kind of mechanism may be configured as follows: a screw is provided in the gripper 402; the screw is tightened to fix the multi-pinhole mask 301a; and the screw is loosened to allow the multi-pinhole mask 301a to be rotatable. FIGS. 13C and 13D are schematic diagrams illustrating the multi-pinhole mask 301a that rotates by 90 degrees when the gripper 402 is rotated by 90 degrees. As described above, the multi-pinhole mask 301a can be rotated when the user moves the gripper 402.

The multi-pinhole camera 301, in which the user can arbitrarily rotate the mask, may be configured such that the multi-pinhole mask 301a includes pinholes disposed asymmetrically with respect to a rotation axis as illustrated in FIG. 13C. This configuration enables various multi-pinhole patterns to be implemented when the user rotates the mask.

Figure 14A:
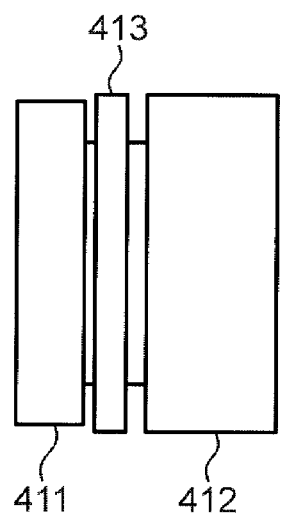
FIG. 14A is a schematic diagram illustrating a configuration of a multi-pinhole camera according to a modification.
Figure 14B:
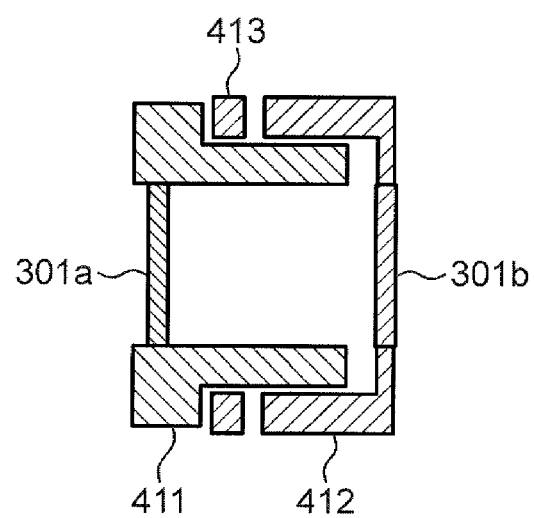
FIG. 14B is a schematic diagram illustrating a configuration of a multi-pinhole camera according to a modification.

As a matter of course, the multi-pinhole camera 301, in which the user can arbitrarily rotate the mask, may be configured without the gripper 402. FIGS. 14A and 14B are each a schematic diagram illustrating another configuration example of the multi-pinhole camera 301 in which a user can arbitrarily rotate a mask. FIG. 14A illustrates an overview of the other example of the multi-pinhole camera 301 in which a user can arbitrarily rotate a mask, and FIG. 14B is a schematic diagram illustrating a section of the other example. The multi-pinhole mask 301a is fixed to a lens barrel 411. Then, the image sensor 301b is installed in another lens barrel 412, and the lens barrel 411 and the lens barrel 412 are rotatable with a screw configuration. That is, the lens barrel 412 is provided outside the lens barrel 411, and a male thread is cut outside the lens barrel 411 serving as a joint part, and a female thread is cut inside the lens barrel 412. The lens barrel 411 includes the male thread to which a fixture 413 is first attached, and then the lens barrel 412 is attached. As with the lens barrel 412, a female thread is cut also in the fixture 413. This configuration described above enables a rotation angle of the multi-pinhole camera 301 to be changed due to change in screwing depth caused by a screwing position of the fixture 413 into the lens barrel 411 when the lens barrel 411 is screwed into the lens barrel 412.

Figure 14C:
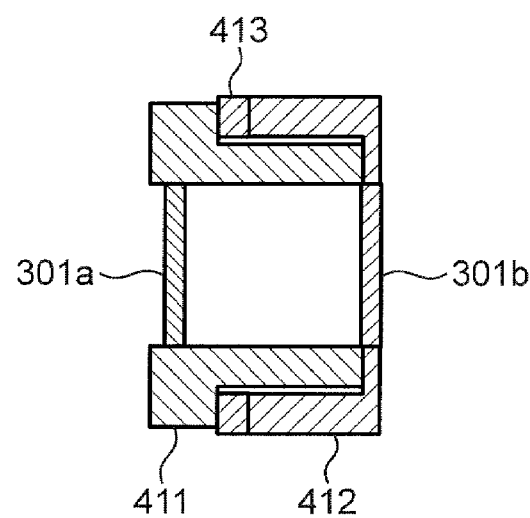
FIG. 14C is a schematic diagram illustrating a configuration of a multi-pinhole camera according to a modification.
Figure 14D:
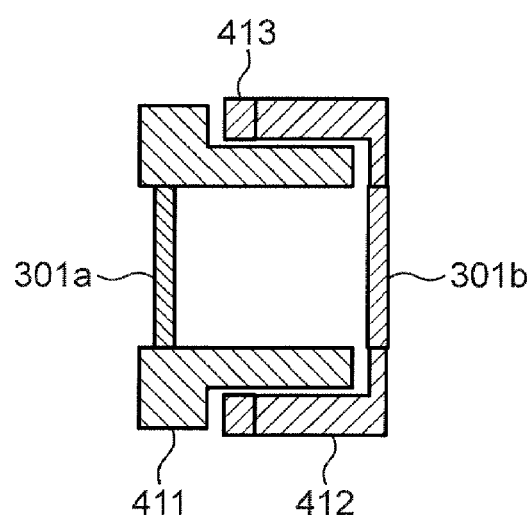
FIG. 14D is a schematic diagram illustrating a configuration of a multi-pinhole camera according to a modification.

FIGS. 14C and 14D are schematic diagrams illustrating that the screwing depth changes and the rotation angle of the multi-pinhole camera 301 changes in accordance with a screwing position of the fixture 413 into the lens barrel 411. FIG. 14C is a schematic diagram when the fixture 413 is screwed onto the lens barrel 411 all the way, and FIG. 14D is a schematic diagram when the fixture 413 is screwed onto the lens barrel 411 only midway. As illustrated in FIG. 14C, when the fixture 413 is screwed onto the lens barrel 411 all the way, the lens barrel 412 can be screwed onto the lens barrel 411 all the way. In contrast, when the fixture 413 is screwed onto the lens barrel 411 only midway, the lens barrel 412 can be screwed onto the lens barrel 411 only midway, as illustrated in FIG. 14D. Thus, the screwing depth changes in accordance with the screwing position of the fixture 413 onto the lens barrel 411, and then the rotation angle of the multi-pinhole mask 301a can be changed.

<Modification in which User Makes Hole in Mask>

Figure 15:
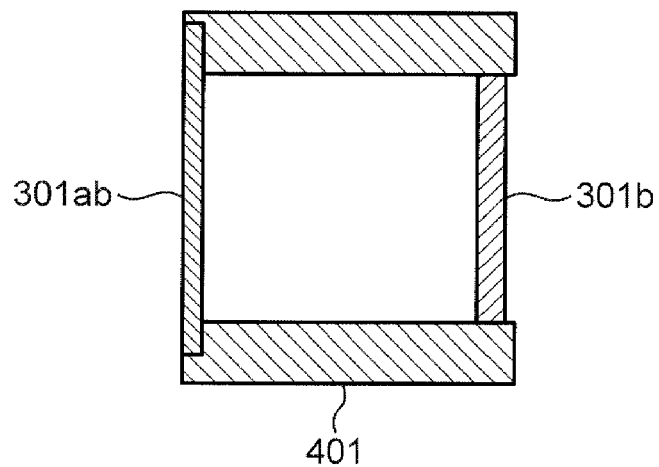
FIG. 15 is a schematic diagram illustrating a configuration of a multi-pinhole camera according to a modification.

FIG. 15 is a schematic diagram of a section of the multi-pinhole camera 301 in which a user can make a hole in an arbitrary place of a mask 301ab attached in front of the image sensor 301b. FIG. 15 illustrates the same components as those in FIG. 13 that are denoted by the same corresponding reference numerals as those in FIG. 13, and that are not described. The mask 301ab initially has no pinhole. When a user makes multiple holes in the mask 301ab at arbitrary positions using a needle or the like, a multi-pinhole mask in an arbitrary shape can be created.

<Modification in which Transmittance of Each Position in Mask is Arbitrarily Set Using Spatial Light Modulator>

Figure 16:
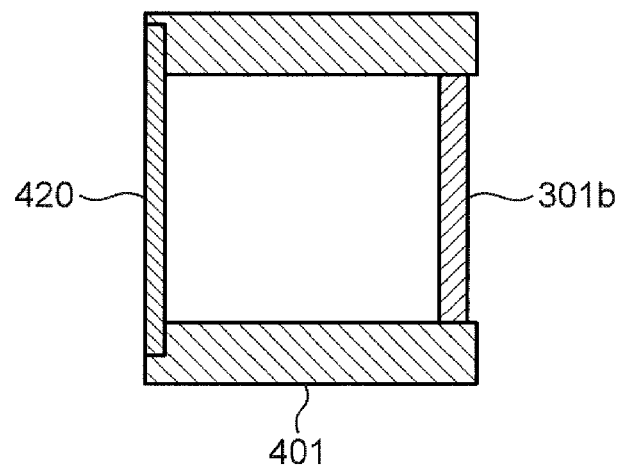
FIG. 16 is a schematic diagram illustrating a configuration of a multi-pinhole camera according to a modification.

FIG. 16 is a schematic diagram of a section of the multi-pinhole camera 301 configured to arbitrarily set transmittance at each position in a mask using a spatial light modulator 420. FIG. 16 illustrates the same components as those in FIG. 15 that are denoted by the same corresponding reference numerals as those in FIG. 15, and that are not described. The spatial light modulator 420 is composed of a liquid crystal or the like, and can change the transmittance for each pixel. The spatial light modulator 420 functions as a multi-pinhole mask. Change of the transmittance can be controlled by a spatial light modulator controller (not illustrated). Thus, when the user selects an arbitrary pattern from multiple transmittance patterns prepared in advance, various mask patterns (multi-pinhole patterns) can be implemented.

<Modification in which Mask is Deformed by Application of External Force>

Figure 17:
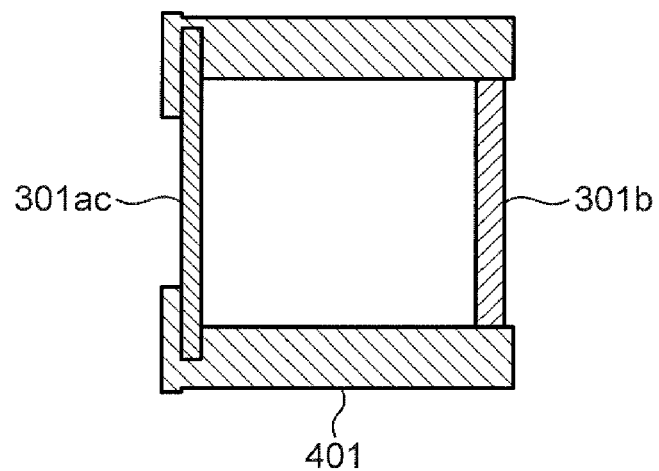
FIG. 17 is a schematic diagram illustrating a configuration of a multi-pinhole camera according to a modification.
Figure 18A:
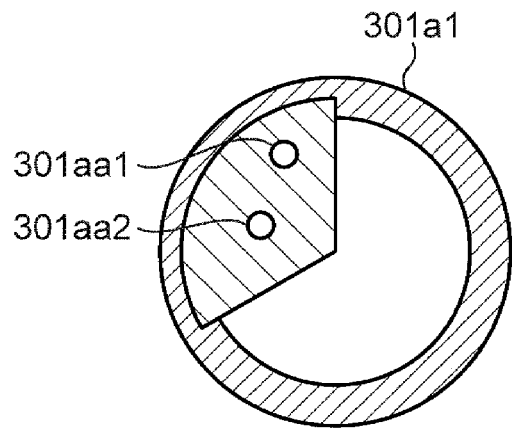
FIG. 18A is a schematic diagram illustrating a configuration of a multi-pinhole camera according to a modification.
Figure 18B:
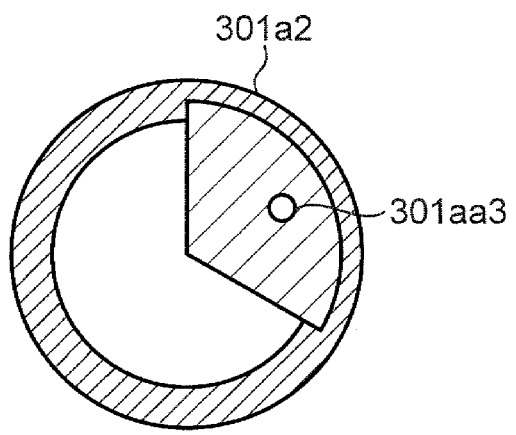
FIG. 18B is a schematic diagram illustrating a configuration of a multi-pinhole camera according to a modification.
Figure 18C:
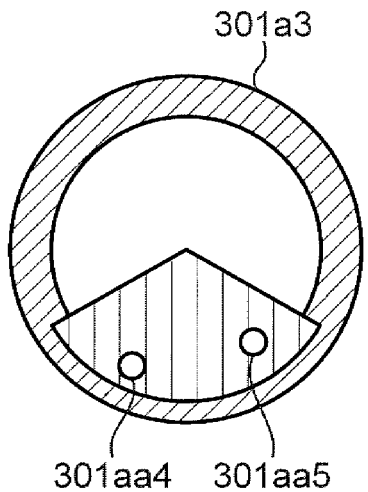
FIG. 18C is a schematic diagram illustrating a configuration of a multi-pinhole camera according to a modification.

FIGS. 17 and 18A to 18F are each a schematic diagram of a section of the multi-pinhole camera 301 configured to deform a mask by application of an external force. FIG. 17 illustrates the same components as those in FIG. 15 that are denoted by the same corresponding reference numerals as those in FIG. 15, and that are not described. A multi-pinhole mask 301ac includes multiple masks 301a1, 301a2, and 301a3, and each mask has a drive unit (not illustrated) that independently applies an external force. FIGS. 18A to 18C are respectively schematic diagrams for illustrating the three masks 301a1, 301a2, and 301a3 constituting the multi-pinhole mask 301ac. Here, each mask has a shape in which a fan shape and a circular ring are combined. As a matter of course, this configuration is an example, the shape is not limited to the fan shape, and the number of components is not limited to three. Each mask is provided with one or more pinholes. The mask may be provided with no pinhole. The mask 301a1 is provided with two pinholes 301aa1 and 301aa2, the mask 301a2 is provided with one pinhole 301aa3, and the mask 301a3 is provided with two pinholes 301aa4 and 301aa5. When these three masks 301a1 to 301a3 are moved by application of an external force, various multi-pinhole patterns can be created.

Figure 18D:
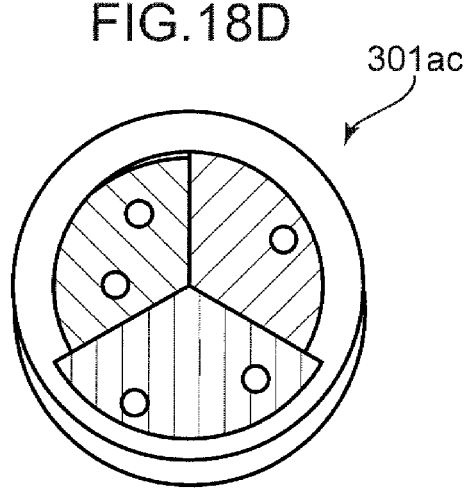
FIG. 18D is a schematic diagram illustrating a configuration of a multi-pinhole camera according to a modification.
Figure 18E:
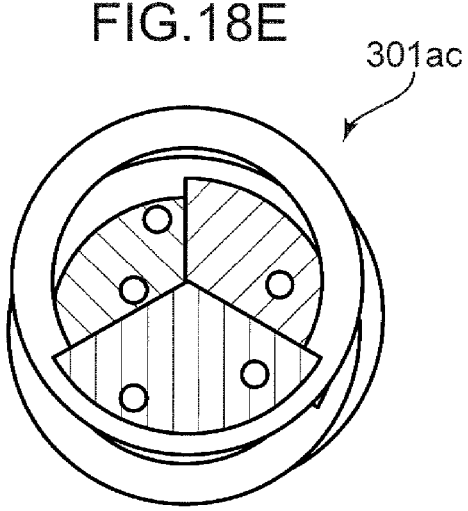
FIG. 18E is a schematic diagram illustrating a configuration of a multi-pinhole camera according to a modification.
Figure 18F:
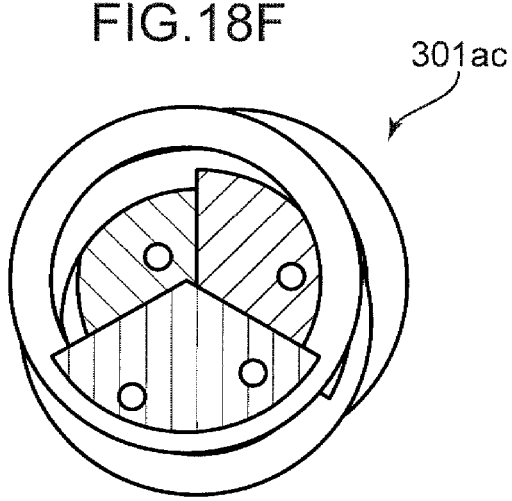
FIG. 18F is a schematic diagram illustrating a configuration of a multi-pinhole camera according to a modification.

FIGS. 18D to 18F illustrate respective three types of multi-pinhole mask 301ac composed of the three masks 301a1 to 301a3. When each of the masks 301a1 to 301a3 is moved in a different mode by corresponding one of drive units (not illustrated), a mask having five pinholes is formed in each of FIGS. 18D and 18E, and a mask having four pinholes is formed in FIG. 18F. This kind of drive unit for a mask can be fabricated by using an ultrasonic motor or a linear motor widely used in autofocus or the like. As described above, the multi-pinhole mask 301ac can be changed in number and position of pinholes by application of an external force.

Figure 19A:
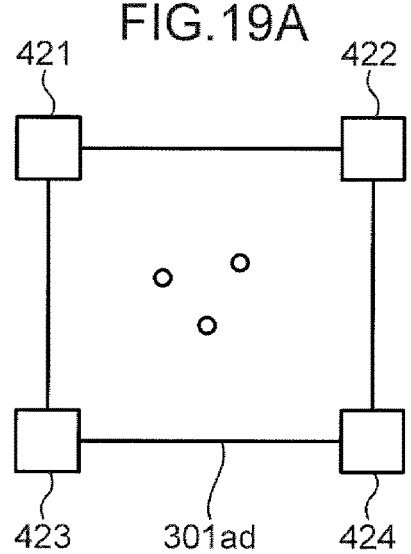
FIG. 19A is a schematic diagram illustrating a configuration of a multi-pinhole camera according to a modification.
Figure 19B:
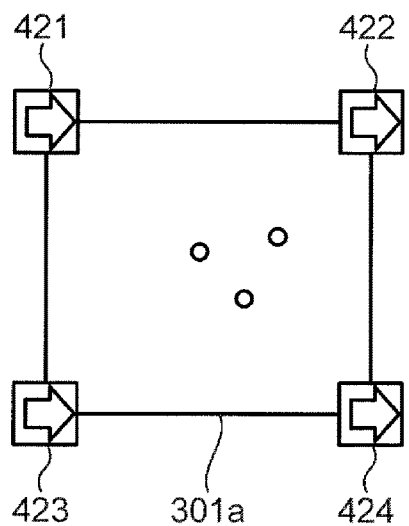
FIG. 19B is a schematic diagram illustrating a configuration of a multi-pinhole camera according to a modification.
Figure 19C:
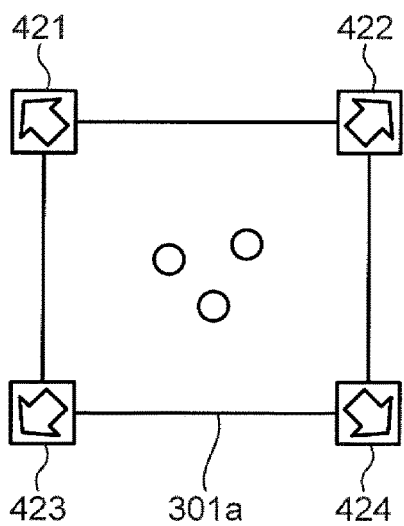
FIG. 19C is a schematic diagram illustrating a configuration of a multi-pinhole camera according to a modification.

As a matter of course, the multi-pinhole mask may be changed not only in number and position of pinholes but also in size thereof. FIGS. 19A to 19C are each a schematic diagram for illustrating a configuration of a multi-pinhole mask 301ad in the multi-pinhole camera 301 configured to deform a mask using application of an external force. The multi-pinhole mask 301ad is made of an elastic material and includes multiple pinholes, and four drive units 421 to 424 capable of independently controlling respective four corners. As a matter of course, the number of drive units does not need to be four. When each of the drive units 421 to 424 is driven, the pinholes in the multi-pinhole mask 301ad can be each changed in position and size.

FIG. 19B is a schematic diagram illustrating a state where the drive units 421 to 424 are driven in the same direction. FIG. 23B illustrates arrows in the respective drive units 421 to 424, the arrows indicating driven directions of the respective drive units. In this case, the multi-pinhole mask 301ad is displaced parallel in the driving direction of the drive units. Then, FIG. 19C is a schematic diagram illustrating a state in which the drive units 421 to 424 are each driven outward from a central part of the multi-pinhole mask 301ad. In this case, the multi-pinhole mask 301ad is stretched in accordance with elasticity, so that the pinholes are each increased in size. The drive units 421 to 424 described above can be fabricated by using an ultrasonic motor or a linear motor widely used in autofocus or the like. As described above, the multi-pinhole mask 301ac can be changed in position and size of pinholes by application of an external force.

Even in the same subject and the same multi-pinhole mask, a mode of multiple images differs depending on a distance between the multi-pinhole camera 301 and the subject 302. Thus, the multi-pinhole camera 301 according to the present embodiment is configured such that the intervals L1 and L2 between the corresponding pinholes are made different from each other to capture an image having effective superimposition of multiple images regardless of the distance between the subject 302 and the multi-pinhole camera 301.

Effectiveness of making the intervals L1 and L2 between the corresponding pinholes different from each other will be described.

Figure 4A:
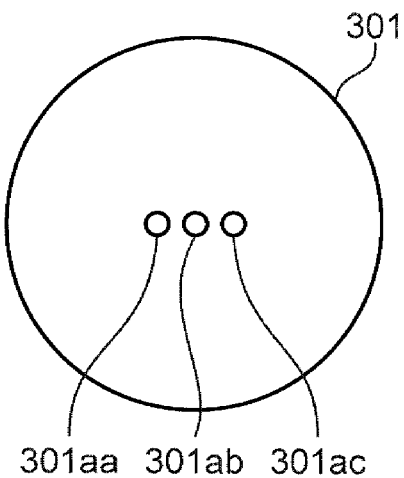
FIG. 4A is a schematic diagram illustrating a configuration of a multi-pinhole mask.
Figure 4B:
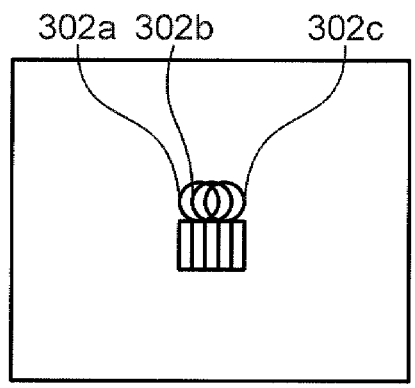
FIG. 4B is a diagram illustrating an example of an image captured by a multi-pinhole camera.
Figure 4C:
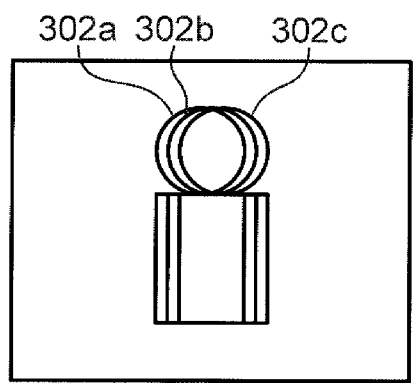
FIG. 4C is a diagram illustrating an example of an image captured by a multi-pinhole camera.

FIG. 4A is a schematic diagram illustrating a configuration of the multi-pinhole mask 301a with unified narrow intervals L2 between corresponding pinholes. FIG. 4B is a diagram illustrating a captured image of the subject 302 located far from the multi-pinhole camera 301. FIG. 4C is a diagram illustrating a captured image of the subject 302 located near the multi-pinhole camera 301. Images captured through the pinholes 301aa to 301ac are subject images 302a to 302c, respectively.

When the intervals between the corresponding pinholes are each unified by the narrow interval L2 as illustrated in FIG. 4A, the amount of disparity among the subject images 302a to 302c captured through the pinholes 301aa to 301ac, respectively, decreases.

Thus, a small subject image due to the subject 302 located far from the multi-pinhole camera 301 allows a subject image captured through corresponding one of the pinholes is effectively superimposed on subject images captured through the corresponding adjacent pinholes. For this reason, the effective superimposition of multiple images enables capturing an image in which privacy of the subject 302 is protected as illustrated in FIG. 4B.

In contrast, a large subject image due to the subject 302 located near the multi-pinhole camera 301 allows a subject image captured through corresponding one of the pinholes is slightly superimposed on subject images captured through the corresponding adjacent pinholes. The slight superimposition, however, causes a too small amount of disparity with respect to a size of the subject image and is not effective superimposition of multiple images, and thus privacy of the subject 302 cannot be protected as illustrated in FIG. 4C.

Figure 5A:
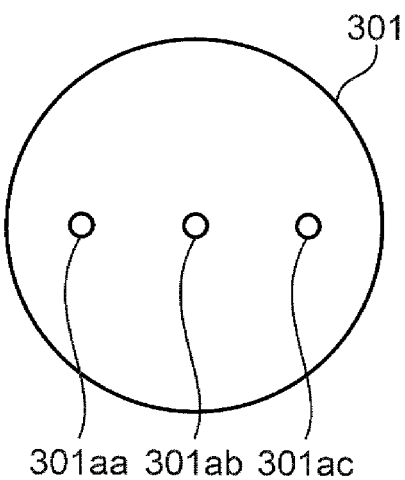
FIG. 5A is a schematic diagram illustrating a configuration of a multi-pinhole mask.
Figure 5B:
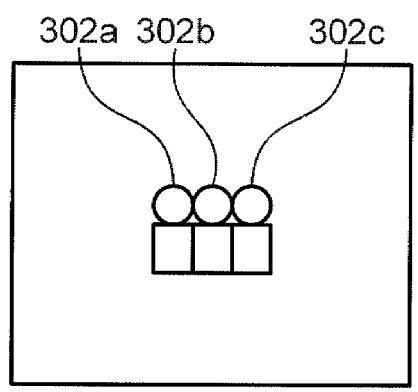
FIG. 5B is a diagram illustrating an example of an image captured by a multi-pinhole camera.
Figure 5C:
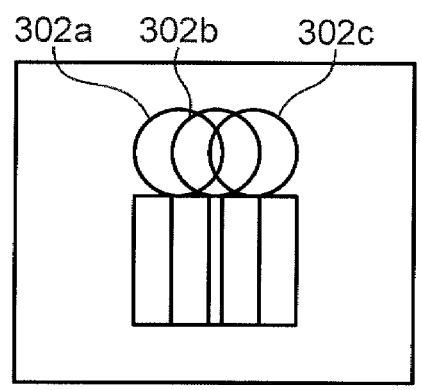
FIG. 5C is a diagram illustrating an example of an image captured by a multi-pinhole camera.

FIG. 5A is a schematic diagram illustrating a configuration of the multi-pinhole mask 301a with unified wide intervals L1 between corresponding pinholes. FIG. 5B is a diagram illustrating a captured image of the subject 302 located far from the multi-pinhole camera 301. FIG. 5C is a diagram illustrating a captured image of the subject 302 located near the multi-pinhole camera 301.

When the intervals between the corresponding pinholes are each unified by the wide interval L1 as illustrated in FIG. 5A, the amount of disparity among the subject images 302a to 302c captured through the pinholes 301aa to 301ac, respectively, increases.

Thus, a large subject image due to the subject 302 located near the multi-pinhole camera 301 allows a subject image captured through corresponding one of the pinholes is effectively superimposed on subject images captured through the corresponding adjacent pinholes. For this reason, the effective superimposition of multiple images enables capturing an image in which privacy of the subject 302 is protected as illustrated in FIG. 5C.

In contrast, a small subject image due to the subject 302 located far from the multi-pinhole camera 301 causes a too large amount of disparity with respect to a size of the subject image, so that subject images captured through the respective pinholes are not superimposed, and thus the privacy of the subject 302 cannot be protected as illustrated in FIG. 5B.

As described above, when the intervals between the corresponding pinholes are unified by L1 or L2, it is difficult to capture an image in which privacy is protected by effective superimposition of multiple images for all subjects 302 different in distance from the multi-pinhole camera 301.

The multi-pinhole camera 301 according to the present embodiment is characterized in that the multi-pinhole mask 301a having the multiple pinholes 301aa to 301ac is provided, and the intervals L1 and L2 between the corresponding pinholes are different from each other.

Figure 6A:
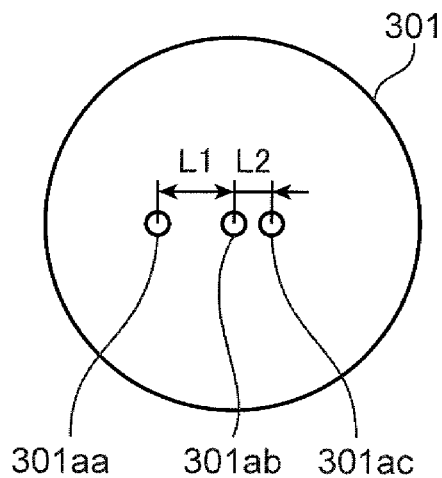
FIG. 6A is a schematic diagram illustrating a configuration of a multi-pinhole mask.
Figure 6B:
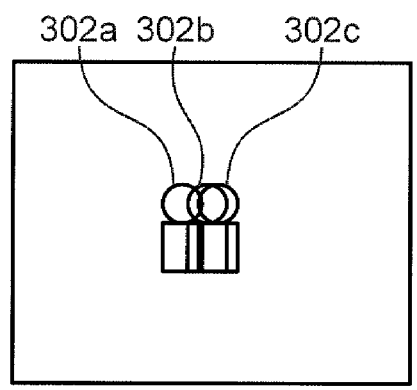
FIG. 6B is a diagram illustrating an example of an image captured by a multi-pinhole camera.
Figure 6C:
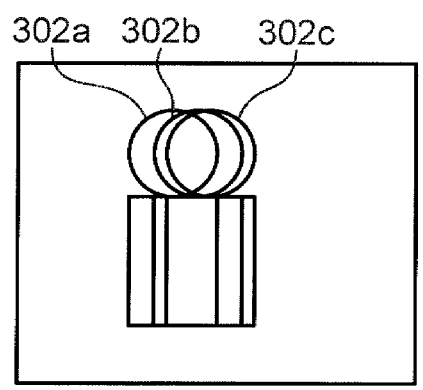
FIG. 6C is a diagram illustrating an example of an image captured by a multi-pinhole camera.

FIG. 6A is a schematic diagram illustrating a configuration of the multi-pinhole mask 301a according to the present embodiment. The pinhole 301aa and the pinhole 301ab are disposed at an interval L1, and the pinhole 301ab and the pinhole 301ac are disposed at an interval L2 (<L1). Although FIG. 6A shows an example in which the three pinholes 301aa to 301ac are formed, the number of pinholes may be three or more. FIG. 6B is a diagram illustrating a captured image of the subject 302 located far from the multi-pinhole camera 301. FIG. 6C is a diagram illustrating a captured image of the subject 302 located near the multi-pinhole camera 301.

As illustrated in FIG. 6A, the intervals L1 and L2 between the corresponding pinholes are different from each other. Thus, the subject images 302a to 302c captured through the pinholes 301aa to 301ac, respectively, are superimposed with different amounts of disparity. For this reason, not only a small subject image due to the subject 302 located far from the multi-pinhole camera 301, but also a large subject image due to the subject 302 located near the multi-pinhole camera 301, allows a subject image captured through corresponding one of the pinholes is superimposed on subject images captured through the corresponding adjacent pinholes. As a result, effective superimposition of multiple images enables capturing an image in which privacy of the subject 302 is protected as illustrated in FIGS. 6B and 6C.

Specifically, a small subject image (FIG. 6B) due to the subject 302 located far from the multi-pinhole camera 301 at a distance equal to or more than a predetermined distance D from the multi-pinhole camera 301 allows the subject images 302b and 302c respectively captured through the pinholes 301ab and 301ac disposed at the narrow interval L2 to be effectively superimposed on each other with a small amount of disparity. Additionally, a large subject image (FIG. 6C) due to the subject 302 located near the multi-pinhole camera 301 at a distance less than the predetermined distance D from the multi-pinhole camera 301 allows the subject images 302a and 302b respectively captured through the pinholes 301aa and 301ab disposed at the wide interval L1 to be effectively superimposed on each other with a large amount of disparity. For this reason, the effective superimposition of multiple images enables capturing an image in which privacy of the subject 302 is protected. The term "effectively superimposed" means that a degree of superimposition (a superimposed area) of two subject images obtained through corresponding two adjacent pinholes falls within a predetermined allowable range. For example, the allowable range has a lower limit value of 30%, and an upper limit value of 90%. That is, when two subject images obtained through corresponding two adjacent pinholes a degree of superimposition of 30% or more and 90% or less, the subject cannot be individually identified even when a third party views the captured image.

Figure 7:
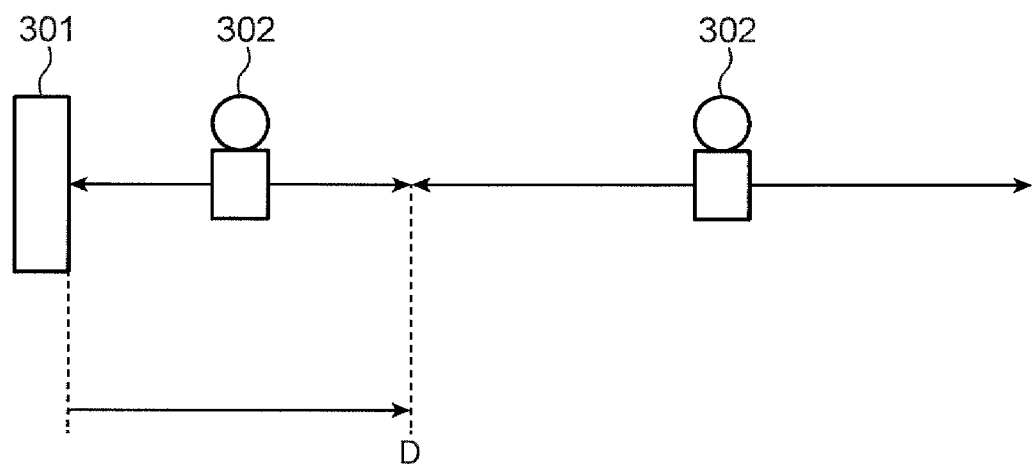
FIG. 7 is a diagram illustrating a predetermined distance between a multi-pinhole camera and a subject.

FIG. 7 is a diagram illustrating the predetermined distance D between the multi-pinhole camera 301 and the subject 302. The predetermined distance D is set in accordance with the intervals L1 and L2, a distance between the image sensor 301b and the multi-pinhole mask 301a, a sensor size and a pixel pitch of the image sensor 301b, and the like, and is set to 5 m, for example. When the subject 302 is located at a distance less than 5 m from the multi-pinhole camera 301 in this example, the subject images 302a and 302b are effectively superimposed on each other due to effective action of the wide interval L1. In contrast, when the subject 302 is located at a distance equal to or more than 5 m from the multi-pinhole camera 301 in this example, the subject images 302b and 302c are effectively superimposed on each other due to effective action of the narrow interval L2.

When the multi-pinhole camera 301 captures an image of the subject 302 located at a distance equal to or more than the predetermined distance D from the multi-pinhole camera 301 (FIG. 6B), the two subject images 302a and 302b captured respectively through the pinholes 301aa and 301ab disposed at the wide interval L1 have a degree of superimposition outside the predetermined range (less than the lower limit value 30%). Similarly, when the multi-pinhole camera 301 captures an image of the subject 302 located at a distance less than the predetermined distance D from the multi-pinhole camera 301 (FIG. 6C), the two subject images 302b and 302c captured respectively through the pinholes 301ab and 301ac disposed at the narrow interval L2 have a degree of superimposition outside the predetermined range (equal to or more than the upper limit value 90%). As described above, even in a state where the privacy of the subject 302 cannot be completely protected by only one of the intervals L1 and L2, the privacy of the subject 302 can be protected regardless of a distance between the multi-pinhole camera 301 and the subject 302 by mixing the intervals L1 and L2 in the same multi-pinhole mask 301a.

As illustrated in FIG. 3, the multi-pinhole camera 301 desirably does not include an optical system, such as a lens, a prism, and a mirror, for forming an image of light from the subject 302 on the image sensor 301b. Eliminating the optical system enables reducing the camera in size, weight, and cost, and improving a design, and also intentionally creating blurring in an image captured by the camera. As a result, the subject 302 included in the captured image is further difficult to be visually identified by a human, so that an effect of protecting the privacy of the subject 302 can be further enhanced.

The image identification system 10 will be described with reference to FIG. 1. The identification unit 106 uses the image identification model that is a learning result of the learning device 20 to identify category information on subjects such as a person (including a behavior and an expression), an automobile, a bicycle, and a traffic light, and positional information on each of the subjects, which are included in an image of a target area captured by the multi-pinhole camera 301. Machine learning such as deep learning using a multilayer neural network may be used for learning for creating the image identification model.

The output unit 107 outputs an identification result of the identification unit 106. The output unit 107 may include an interface unit to present the identification result to the user by an image, text, voice, or the like, or may include an apparatus controller to change a control method depending on the identification result.

The learning device 20 includes the learning database 102, the PSF information acquisition unit 103, the database correction unit 104, and the learning unit 105. The learning device 20 performs learning for creating the image identification model to be used by the identification unit 106 in association with PSF information of a computational imaging camera 101 that is to be actually used for capturing an image of the target area.

Figure 8:
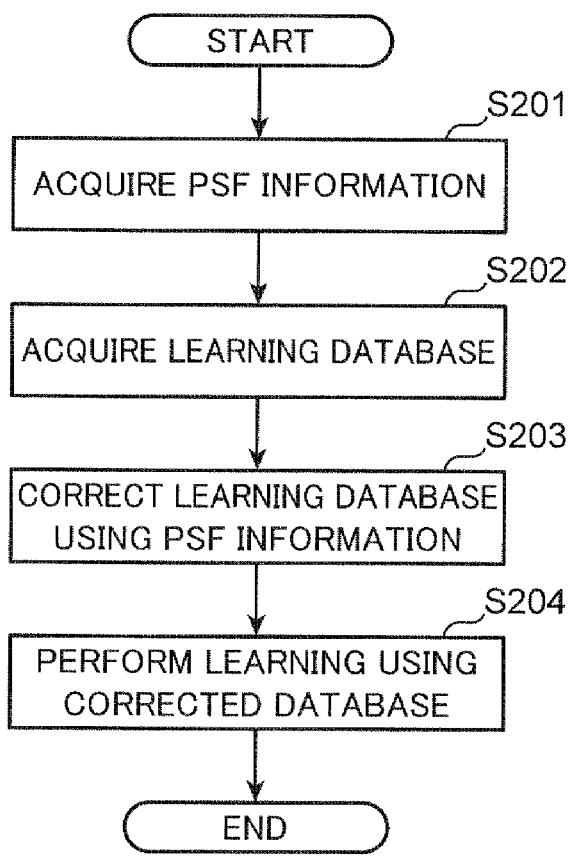
FIG. 8 is a flowchart illustrating a procedure of main processing of a learning device.

FIG. 8 is a flowchart illustrating a procedure of main processing of the learning device 20 of the image identification system 10.

The PSF information acquisition unit 103 first acquires PSF information that indicates a mode of a computational image expressing what type of computational image is captured by the computational imaging camera 101 (step S201). In step S201, the multi-pinhole camera 301 may include a transmitter, and the PSF information acquisition unit 103 may include a receiver, thereby exchanging the PSF information of a wired or wireless manner. Alternatively, the PSF information acquisition unit 103 may include an interface, and the user may input the PSF information to the PSF information acquisition unit 103 via the interface.

The PSF (Point Spread Function) is a transfer function of a camera such as a multi-pinhole camera or a coded aperture camera, and is expressed by the following relationship.

$$y=k*x$$

Here, y is a computational image with blurring captured by the multi-pinhole camera 301, k is a PSF, and x is a normal image without blurring of a scene captured by a normal camera. Then, * is a convolution operator.

The PSF can be acquired by photographing a point light source with the multi-pinhole camera 301. This can be seen from the fact that the PSF corresponds to an impulse response of the camera. That is, a captured image itself of the point light source obtained by capturing an image of the point light source with the multi-pinhole camera 301 is the PSF as captured image information of the multi-pinhole camera 301. Here, a difference image between a captured image including the point light source in a lighting state and a captured image including the point light source in a non-lighting state is desirably used as the captured image of the point light source.

Next, the database correction unit 104 acquires a normal image without blurring included in the learning database 102, and the learning unit 105 acquires annotation information included in the learning database 102 (step S202).

Subsequently, the database correction unit 104 corrects the learning database 102 using the PSF information acquired by the PSF information acquisition unit 103 (step S203). For example, when the identification unit 106 identifies a behavior of a person in an environment, the learning database 102 holds multiple normal images without blurring photographed by a normal camera, and annotation information (correct answer label) that is assigned to each image and that indicates a position at which the person has performed what kind of behavior in the image. When a normal camera is used, annotation information may be assigned to an image captured by the camera. However, when a computational image of the multi-pinhole camera 301, it is difficult to assign annotation information to the image because a person cannot find what the image shows even when looking at the image. Additionally, even when learning processing is performed on an image captured by a normal camera significantly different from the multi-pinhole camera 301, the identification unit 106 does not increase in identification accuracy. Thus, the identification accuracy is improved as follows: a database in which annotation information is preliminarily assigned to an image captured by a normal camera is held as the learning database 102; only the captured image is deformed in accordance with the PSF information of the multi-pinhole camera 301 to create learning data set corresponding to the multi-pinhole camera 301; and the learning processing is performed. For this processing, the database correction unit 104 calculates a corrected image y below using the PSF information acquired by the PSF information acquisition unit 103 for an image z that is photographed by the normal camera and that is prepared in advance.

$$y = k * z$$

Here, k represents the PSF information acquired by the PSF information acquisition unit 103, and * represents a convolution operator.

The learning unit 105 performs the learning processing using the corrected image calculated by the database correction unit 104 and the annotation information acquired from the learning database 102 (step S204). For example, when the identification unit 106 is constructed by a multi-layer neural network, machine learning by deep learning is performed using the corrected image and the annotation information as teacher data. As a prediction error correction algorithm, a back propagation method or the like may be used. As a result, the learning unit 105 creates an image identification model for the identification unit 106 to identify an image captured by the multi-pinhole camera 301. The corrected image matches the PSF information of the multi-pinhole camera 301, so that the learning described above enables learning suitable for the multi-pinhole camera 301 to allow the identification unit 106 to perform identification processing with high accuracy.

When the subject 302 is located at a distance less than the predetermined distance D from the multi-pinhole camera 301, the present embodiment allows the degree of superimposition of the two subject images 302a and 302b captured respectively through the first pinhole 301aa and the second pinhole 301ab to be within the predetermined range, and thus causing the multiple subject images to be visually unrecognizable by a human due to superimposition of multiple images, thereby protecting privacy of the subject 302. In contrast, when the subject 302 is located at a distance equal to or more than the predetermined distance D from the multi-pinhole camera 301, the present embodiment allows the degree of superimposition of the two subject images 302b and 302c captured respectively through the second pinhole 301ab and the third pinhole 301ac to be within the predetermined range, and thus causing the multiple subject images to be visually unrecognizable by a human due to superimposition of multiple images, thereby protecting privacy of the subject 302. As a result, the privacy of the subject 302 can be protected regardless of the distance between the multi-pinhole camera 301 and the subject 302.

(First Modification)

Although opening areas of the respective pinholes 301aa to 301ac are set to be equal to each other in the above embodiment, the respective pinholes 301aa to 301ac may be made different in diameter or shape to have opening areas different from each other.

Figure 9:
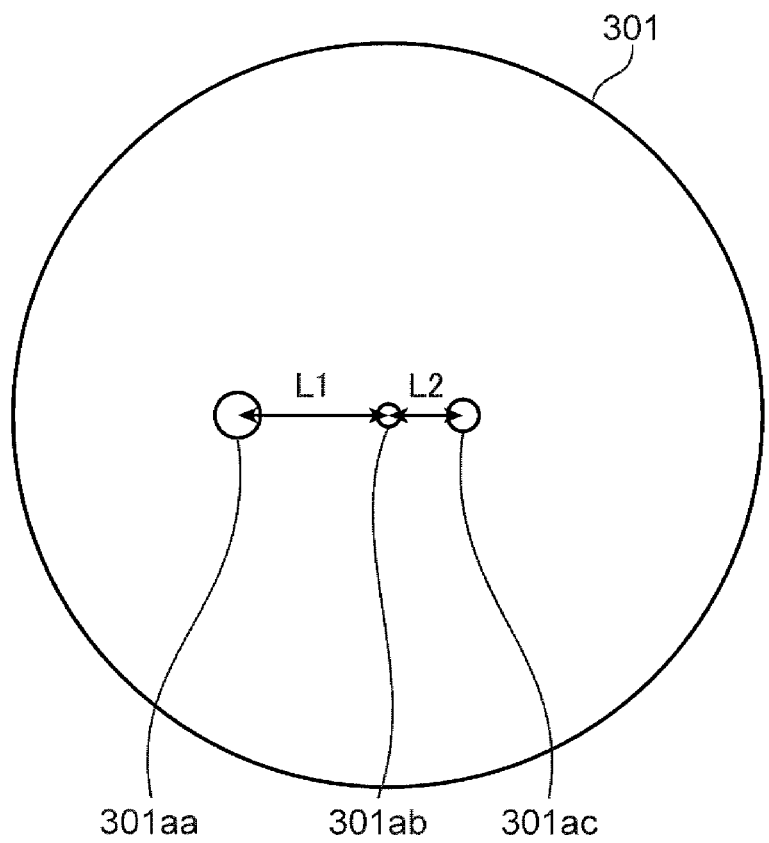
FIG. 9 is a schematic diagram illustrating a structure of a multi-pinhole camera according to a first modification.

FIG. 9 is a schematic diagram illustrating a structure of a multi-pinhole camera 301 according to a first modification. FIG. 9 illustrates an example in which the pinhole 301ab at the center has an opening area set to be the smallest, the pinhole 301ac on a right side and close to the pinhole 301ab has an opening area set to be the second smallest, and the pinhole 301aa on a left side and far from the pinhole 301ab has an opening area is set to be the largest. As an opening area of a pinhole increases, a degree of blurring of a subject image increases. Thus, the subject image 302a corresponding to the pinhole 301aa has the largest degree of blurring in this example.

The present modification causes a different degree of blurring of each of the subject images 302a to 302c due to the difference in opening area of each of the pinholes 301aa to 301ac. Mixture of multiple subject images 302a to 302c different in a degree of blurring causes a captured image to be more complicated. As a result, the subject 302 included in the captured image is further difficult to be visually identified by a human, so that an effect of protecting the privacy of the subject 302 can be further enhanced.

(Second Modification)

Figure 10:
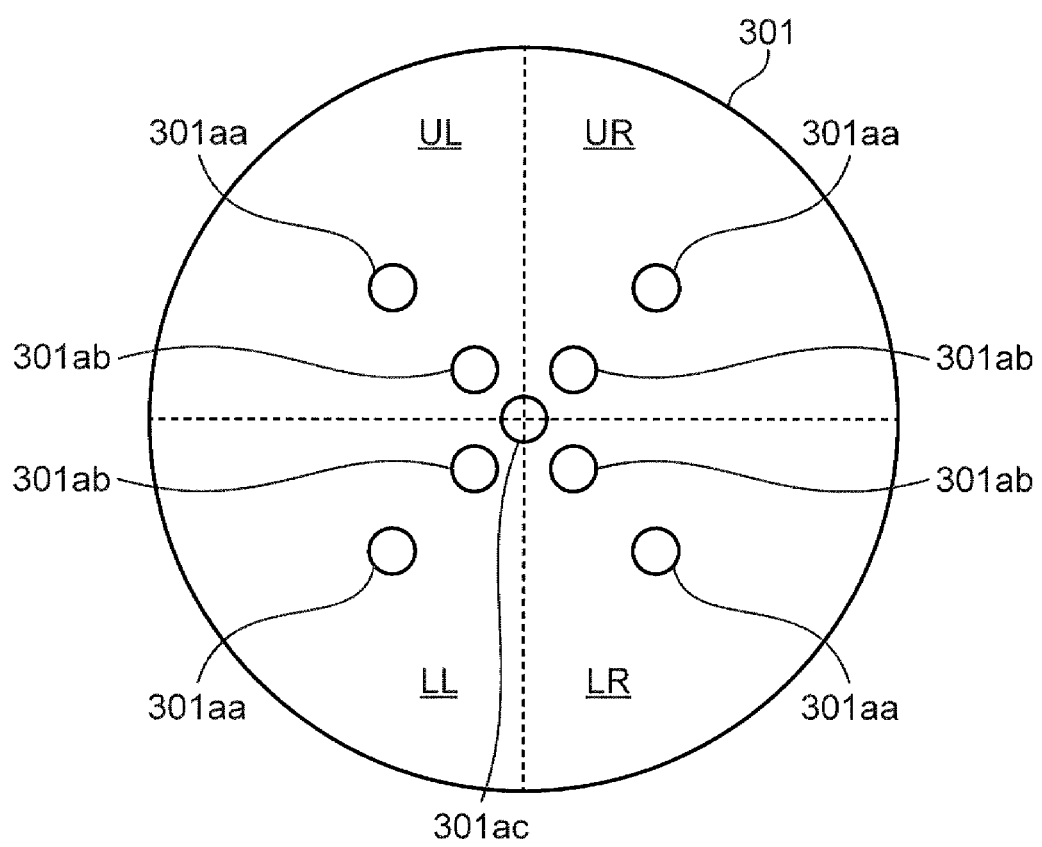
FIG. 10 is a schematic diagram illustrating a structure of a multi-pinhole camera according to a second modification.

FIG. 10 is a schematic diagram illustrating a structure of a multi-pinhole camera 301 according to a second modification. FIG. 10 illustrates an example in which the multi-pinhole mask 301a has a main surface that faces a light receiving surface of the image sensor 301b and that is divided into a total of four regions of a region UR in the upper right, a region LR in the lower right, a region UL in the upper left, and a region LL in the lower left. The main surface is provided at its center with one pinhole 301ac. The multiple regions UR, LR, UL, and LL are each provided with pinholes 301ab and 301aa. This configuration allows the multi-pinhole mask 301a to have a mask pattern in which each of the multiple regions UR, LR, UL, and LL includes a pinhole set of a first pinhole 301aa and a second pinhole 301ab that are provided at a wide interval L 1, and a pinhole set of a third pinhole 301ac and the second pinhole 301ab that are provided at a narrow interval L2. The number of regions acquired by dividing the main surface of the multi-pinhole mask 301a is not limited to four, and may be two or more.

It is assumed that the multi-pinhole camera 301 of this drawing has a back side on which the image sensor 301b exists and a proximal side on which the subject 302 exists. At this time, when the subject 302 exists in the lower right region, light passing through the pinholes 301ab and 301aa in the region UL is not received by the image sensor 301b under conditions where the image sensor 301b is not sufficiently large or an incident angle is too large. That is, when the multi-pinhole mask 301a includes a pinhole existing only in the region UL, the subject 302 existing in the lower right region is not photographed, or only light passing through the pinhole 301ac is received. Thus, a multiple image is not formed, and the privacy of the subject 302 cannot be protected. Similarly, when the subject 302 exists in the upper left region, light passing through the pinholes 301ab and 301aa in the region LR is not received by the image sensor 301b under conditions where the image sensor 301b is not sufficiently large or an incident angle is too large. That is, when the multi-pinhole mask 301a includes a pinhole existing only in the region LR, the subject 302 existing in the upper left region is not photographed, or only light passing through the pinhole 301ac is received. Thus, a multiple image is not formed, and the privacy of the subject 302 cannot be protected. In contrast, the multi-pinhole camera 301 of the present modification allows each of the multiple regions UR, LR, UL, and LL to include the pinhole set of the first pinhole 301aa and the second pinhole 301ab that are provided at the wide interval L1, and the pinhole set of the third pinhole 301ac and the second pinhole 301ab that are provided at the narrow interval L2, so that privacy of the subject can be protected regardless of a position of the subject 302.

The present modification enables light from the subject 302 to reach the image sensor 301b through the pinhole set on a side close to the subject 302 even at a large angle of incidence formed by a front direction of the multi-pinhole camera 301 and a position of the subject 302, or when the subject is obliquely positioned with respect to the front of the camera. As a result, a field of view of the multi-pinhole camera 301, at which superimposition of multiple images is feasible, can be expanded.

(Third Modification)

Figure 11:
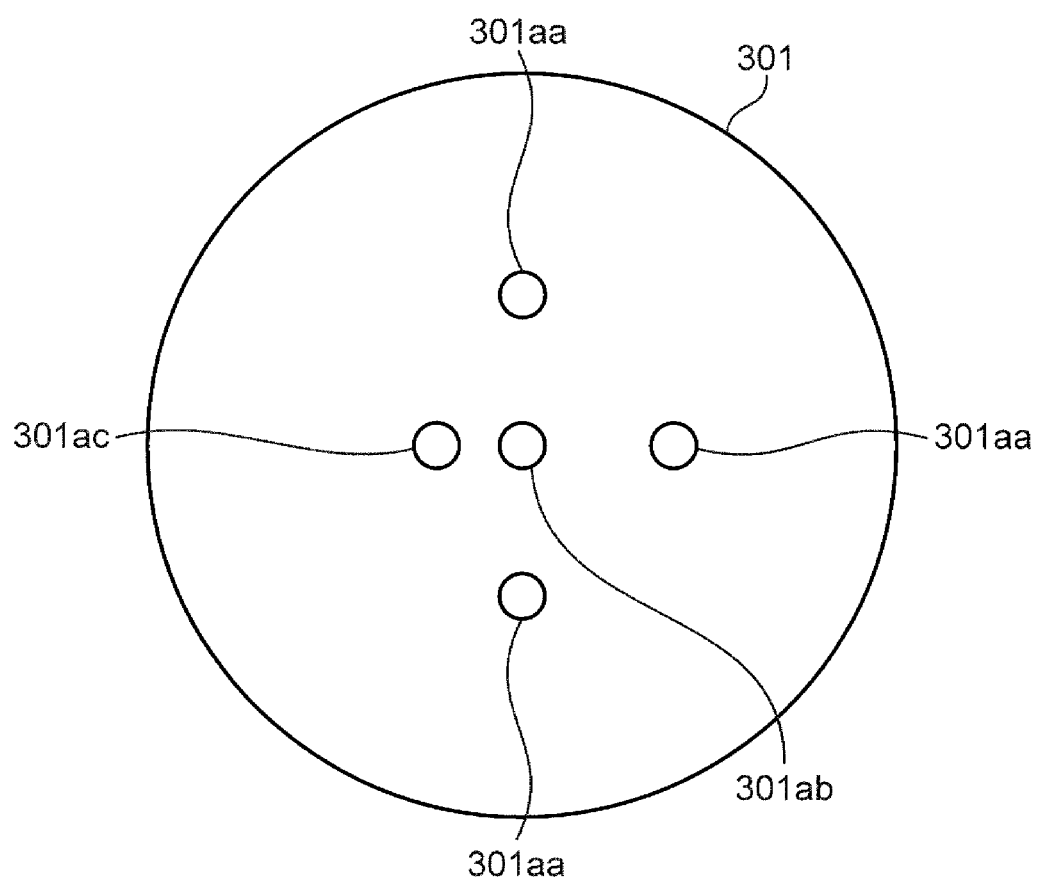
FIG. 11 is a schematic diagram illustrating a structure of a multi-pinhole camera according to a first example of a third modification.

FIG. 11 is a schematic diagram illustrating a structure of a multi-pinhole camera 301 according to a first example of a third modification. A multi-pinhole mask 301a has a main surface provided at its center with one pinhole 301ab. Additionally, three pinholes 301aa and one pinhole 301ac are provided around the pinhole 301ab. This configuration allows the number (three sets in this example) of pinhole sets including a first pinhole 301aa and a second pinhole 301ab that are provided at a wide interval L1 to be larger than the number (one set in this example) of pinhole sets including a third pinhole 301ac and the second pinhole 301ab that are provided at a narrow interval L2. The number of each of the pinhole sets is not limited to this example.

This configuration enables increasing the number of valid superimposition of a multiple image with a large amount of disparity among subject images when the subject 302 is located at a distance less than a predetermined distance D from the multi-pinhole camera 301. As a result, the subject 302 included in a captured image is further difficult to be visually identified by a human, so that an effect of protecting the privacy of the subject 302 can be further enhanced. This configuration is particularly effective for operation in a room where a distance between the multi-pinhole camera 301 and the subject 302 tends to be short.

Figure 12:
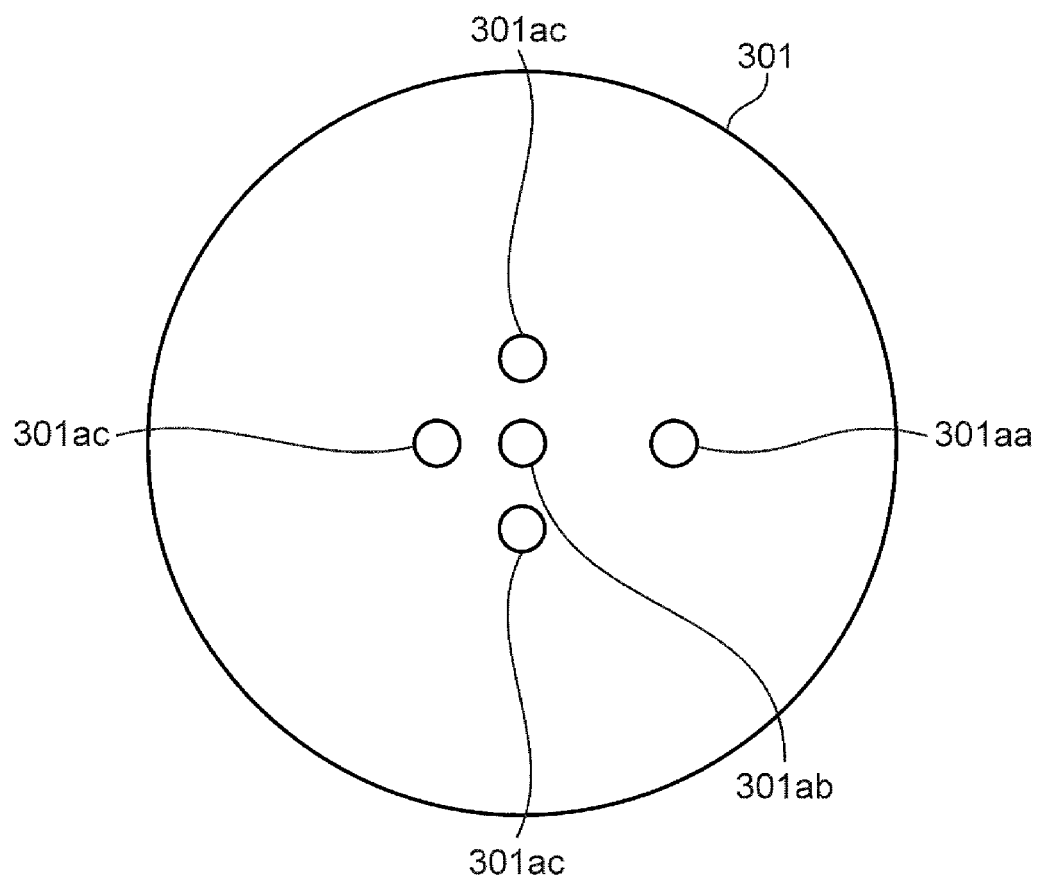
FIG. 12 is a schematic diagram illustrating a structure of a multi-pinhole camera according to a second example of the third modification.

FIG. 12 is a schematic diagram illustrating a structure of a multi-pinhole camera 301 according to a second example of the third modification. A multi-pinhole mask 301a has a main surface provided at its center with one pinhole 301ab. Additionally, one pinhole 301aa and three pinholes 301ac are provided around the pinhole 301ab. This configuration allows the number (three sets in this example) of pinhole sets including a third pinhole 301ac and a second pinhole 301ab that are provided at a narrow interval L2 to be larger than the number (one set in this example) of pinhole sets including a first pinhole 301aa and the second pinhole 301ab that are provided at a wide interval L1. The number of each of the pinhole sets is not limited to this example.

This configuration enables increasing the number of valid superimposition of a multiple image with a small amount of disparity among subject images when the subject 302 is located at a distance equal to or more than a predetermined distance D from the multi-pinhole camera 301. As a result, the subject 302 included in a captured image is further difficult to be visually identified by a human, so that an effect of protecting the privacy of the subject 302 can be further enhanced. This configuration is particularly effective for outdoor operation in which a distance between the multi-pinhole camera 301 and the subject 302 tends to be long.

INDUSTRIAL APPLICABILITY

The learning method and the identification method according to the present disclosure are particularly useful for an image identification system in an environment requiring privacy protection of a subject.

The invention claimed is:

1. A multi-pinhole camera, comprising:
an image sensor; and
a mask disposed between a light receiving surface of the image sensor and a subject and having a mask pattern provided with multiple pinholes including a first pinhole, a second pinhole adjacent to the first pinhole, and a third pinhole adjacent to the second pinhole,
wherein an interval between the first pinhole and the second pinhole is set to a first interval,
the first interval allowing a degree of superimposition of two subject images captured through the first pinhole and the second pinhole to be within a predetermined range when the subject located at a distance less than a predetermined distance from the multi-pinhole camera is captured by the multi-pinhole camera,
an interval between the second pinhole and the third pinhole is set to a second interval narrower than the first interval,
the second interval allowing a degree of superimposition of two subject images captured through the second pinhole and the third pinhole to be within the predetermined range when the subject located at a distance equal to or more than the predetermined distance from the multi-pinhole camera is captured by the multi-pinhole camera,
when the multi-pinhole camera captures an image of the subject located at the distance equal to or more than the predetermined distance from the multi-pinhole camera, a degree of superimposition of two subject images captured through the first pinhole and the second pinhole is outside the predetermined range, and
when the multi-pinhole camera captures an image of the subject located at the distance less than the predetermined distance from the multi-pinhole camera, a degree of superimposition of two subject images captured through the second pinhole and the third pinhole is outside the predetermined range.

2. The multi-pinhole camera according to claim 1, wherein the multi-pinhole camera includes no optical system that forms an image of light from a subject on the image sensor.

3. The multi-pinhole camera according to claim 1, wherein opening areas of the first pinhole, the second pinhole, and the third pinhole are different from each other.

4. The multi-pinhole camera according to claim 1, wherein when the mask is divided into multiple regions in the mask pattern, each of the multiple regions includes a pinhole set of the first pinhole and the second pinhole, and a pinhole set of the third pinhole and the second pinhole.

5. The multi-pinhole camera according to claim 1, wherein in the mask pattern, a number of pinhole sets including the first pinhole and the second pinhole is larger than a number of pinhole sets including the third pinhole and the second pinhole.

6. The multi-pinhole camera according to claim 1, wherein in the mask pattern, a number of pinhole sets including the third pinhole and the second pinhole is larger than a number of pinhole sets including the first pinhole and the second pinhole.

7. An image identification system, comprising:
   the multi-pinhole camera according to claim 1;
   an identification unit that includes a processor and that identifies an image captured by the multi-pinhole camera based on an image identification model; and
   an output unit that outputs an identification result acquired by the identification unit.

* * * * *